United States Patent
Mao et al.

(10) Patent No.: US 12,165,777 B2
(45) Date of Patent: Dec. 10, 2024

(54) METHOD OF PREPARING A FUSION REACTOR DIVERTOR COMPONENT

(71) Applicant: HEFEI INSTITUTES OF PHYSICAL SCIENCE, CHINESE ACADEMY OF SCIENCES, Hefei (CN)

(72) Inventors: Xin Mao, Hefei (CN); Xuebing Peng, Hefei (CN); Yuntao Song, Hefei (CN); Kun Lu, Hefei (CN); Wei Song, Hefei (CN); Peng Liu, Hefei (CN); Xinyuan Qian, Hefei (CN)

(73) Assignee: HEFEI INSTITUTES OF PHYSICAL SCIENCE, CHINESE ACADEMY OF SCIENCES, Hefei (CN)

(*) Notice: Subject to any disclaimer, the term of this patent is extended or adjusted under 35 U.S.C. 154(b) by 0 days.

(21) Appl. No.: 18/401,172

(22) Filed: Dec. 29, 2023

(65) Prior Publication Data
US 2024/0136076 A1  Apr. 25, 2024

Related U.S. Application Data

(63) Continuation of application No. PCT/CN2023/132265, filed on Nov. 17, 2023.

(51) Int. Cl.
*G21B 1/13* (2006.01)

(52) U.S. Cl.
CPC ..................... *G21B 1/13* (2013.01)

(58) Field of Classification Search
CPC .......................................................... G21B 1/13
See application file for complete search history.

(56) References Cited

U.S. PATENT DOCUMENTS

| | | | | |
|---|---|---|---|---|
| 5,583,895 A * | 12/1996 | Filipuzzi | ................ | G21B 1/13 376/150 |
| 2002/0172316 A1* | 11/2002 | Matera | ..................... | G21B 1/11 376/134 |

FOREIGN PATENT DOCUMENTS

| | | | |
|---|---|---|---|
| CN | 107507651 A | * | 12/2017 |
| CN | 112420221 A | | 2/2021 |
| CN | 113851232 A | | 12/2021 |
| CN | 115985524 A | | 4/2023 |
| WO | 2022188461 A1 | | 9/2022 |

OTHER PUBLICATIONS

Dai, Huaichu, et al. "Conceptual design of CFETR divertor remote handling compatible structure." Fusion Engineering and Design 112 (2016): 143-147. (Year: 2016).*
Shijun Qin et al., "Preliminary Design Progress of the CFETR Water-Cooled Divertor", IEEE Transactions on Plasma Science, Jun. 30, 2020, vol. 48, No. 6, pp. 1733-1742.
Shijun Qin et al., "Design, analysis and remote handling compatibility for a CFETR long leg divertor concept", Fusion Engineering and Design, Feb. 21, 2021, vol. 167, pp. 1-10.

* cited by examiner

*Primary Examiner* — Sharon M Davis

(57) ABSTRACT

A method of preparing a fusion reactor divertor component is provided. Outer vertical target plasma-facing units are pinned to an outer vertical target transition support. Outer horizontal target plasma-facing units are pinned to an outer horizontal target transition support. End bending tubes of the outer vertical target plasma-facing units are aligned with reserved holes in the outer vertical target transition support. The outer vertical target transition support, an outer transition block and the outer horizontal target transition support are fixed and positioned. A lower cover plate is welded with the transition block main body. An S-shaped cover plate is welded with the outer vertical target transition support. A lower cover plate is welded with the outer horizontal target transition support. A preliminary outer target assembly structure is formed and finish machined.

1 Claim, 16 Drawing Sheets

(c)

METHOD OF PREPARING A FUSION REACTOR DIVERTOR COMPONENT

CROSS-REFERENCE TO RELATED APPLICATIONS

This application is a continuation of International Patent Application No. PCT/CN2023/132265, filed on Nov. 17, 2023, which claims the benefit of priority from Chinese Patent Application No. 202211665274.3, filed on Dec. 23, 2022. The content of the aforementioned application, including any intervening amendments thereto, is incorporated herein by reference in its entirety.

TECHNICAL FIELD

This application relates to advanced fabrication of internal components of Tokamak fusion devices, and more particularly to a method of preparing a fusion reactor divertor component.

BACKGROUND

Divertor is one of the most important internal components of the magnetic confinement Tokamak fusion reactor, which mainly plays a role in extracting heat and ash produced by the fusion reaction to ensure the normal operation of the fusion reactor. A single divertor includes an inner target, a dome, an outer target, and a cassette body. The cassette body serves as the main support component to integrate the inner target, the dome, and the outer target, and provides a coolant for the inner target, the dome, and the outer target. The inner target, dome, and outer target are collectively referred to as the plasma-facing component of the divertor, which in turn consists of a plasma-facing unit and a transition support.

A structure meeting operation modes of different plasma configurations is often adopted in the design of the plasma-facing unit of the inner and outer targets. Therefore, under the premise of ensuring that the temperature and stress of the plasma-facing unit meet the allowable values, the cooling of the V-shaped corners of the plasma-facing unit of the inner and outer targets should be considered. A separate maintenance strategy is widely used in the design of the remote handling compatibility of the divertor. As published in Chinese patent application Nos. 2020112447133.0 and 202110978711.6, only the susceptible plasma-facing components are maintained, and the cassette body is not maintained. Based on the characteristics of the plasma-facing components (requirement of cooling to remove high heat loads and nuclear heat, and fixed position of the connecting structure), it is therefore necessary to consider the position of the internal flow channels in the transition support of the plasma-facing components and the machining feasibility.

SUMMARY

In view of the deficiencies in the prior art, this application provides a plasma-facing component (PFC) of a fusion reactor divertor and a preparation method thereof, in which an inner target transition support is integrated with a dome transition support to form an inner target-dome transition support. The inner target-dome transition support and an outer horizontal target transition support are prepared using two materials, and the internal channel connection is achieved by using an S-shaped flow channel and a collector box. The plasma-facing component (PFC) designed herein can withstand high thermal load, and have uniform fluid distribution and excellent machinability.

Technical solutions of this application are described as follows.

In a first aspect, this application provides a plasma-facing component of a fusion reactor divertor, the fusion reactor divertor comprising the plasma-facing component and a cassette body, and the plasma-facing component comprising:

an inner target assembly;
a dome; and
an outer target assembly;
wherein the cassette body is configured to support and integrate the inner target assembly, the dome, and the outer target assembly;
the inner target assembly comprises an inner vertical target, an inner horizontal target, a first transition support connected to the inner vertical target, and an inner transition block;
the dome comprises a dome umbrella and a second transition support;
the outer target assembly comprises an outer vertical target, an outer horizontal target, and a third transition support connected to the outer horizontal target;
the first transition support, the inner transition block, and the second transition support are integrated into an inner target-dome transition support; and
the inner transition block is made of a stainless steel to increase a strength of a V-shaped region of the inner target assembly; the inner target-dome transition support is internally provided with a first flow channel group; the third transition support is internally provided with a second flow channel group; a gap is provided between the first flow channel group and the second flow channel group; and the gap is configured to accommodate a water inlet pipe and a water outlet pipe of the plasma-facing component and a connecting structure between the plasma-facing component and the cassette body.

In an embodiment, the outer vertical target plate comprises a plurality of first plasma-facing units; the outer horizontal target plate comprises a plurality of second plasma-facing units; the inner vertical target plate has the same structure as the outer vertical target plate; the inner horizontal target plate has the same structure as the outer horizontal target plate; and the dome umbrella also comprises a plurality of plasma facing units.

In an embodiment, the materials of the plasma-facing units constituting the inner vertical target, the inner horizontal target, the dome umbrella, the outer horizontal target and the outer vertical target are tungsten, oxygen-free copper, chromium-zirconium copper, or stainless steel, which are made into plasma-facing units by casting, explosive welding, hot isostatic pressing, braze welding, or argon arc welding processes.

In an embodiment, the third transition support of the outer target plate comprises an outer horizontal target transition support, an outer transition block, and an outer vertical target transition support, which are made of stainless steel or high-strength stainless steel. The outer transition block is made of high-strength stainless steel to increase the strength of the second V-shaped region of the outer target plate.

In an embodiment, the flow channels in the third transition support comprise an S-shaped water channel, an intermediate flow channel, two side flow channels, a first collector box, and a second collector box; the S-shaped water channel and the second collector box are disposed in the outer vertical target transition support; the intermediate water channel and the two side flow channels are disposed in the outer transition block; and the first collector box is disposed in the outer horizontal target transition support.

In an embodiment, the first flow channel group is similar to the second flow channel group; the first transition support comprises two first collector boxes; the second transition support comprises a plurality of second collector boxes; the first flow channel group comprises a first S-shaped flow channel, a first flow channel, a second S-shaped flow channel, a second flow channel, a first intermediate flow channel and two third flow channels respectively arranged at two sides of the first intermediate flow channel; the first S-shaped flow channel and the first flow channel are provided in the first transition support; the second S-shaped flow channel and the second flow channel are provided in the second transition support; and the first intermediate flow channel and the two third flow channels are provided in the inner transition block.

In an embodiment, a V-shaped region of the outer target assembly is connected by an outer transition block; the outer transition block comprises a second intermediate flow channel, which is configured for communicating with a coolant flowing through a plasma-facing unit of the outer target assembly; the V-shaped region of the inner target assembly is connected by the inner transition block; and the first intermediate flow channel is configured for communicating with a coolant flowing through a plasma-facing unit of the inner target assembly.

In a second aspect, this application provides a method of preparing an outer target assembly of the above plasma-facing component, comprising:
(a) pinning a plurality of outer vertical target plasma-facing units to an outer vertical target transition support without an S-shaped cover plate; and pinning a plurality of outer horizontal target plasma-facing unit to an outer horizontal target transition support;
(b) aligning end bending tubes of the plurality of outer vertical target plasma-facing units respectively with a plurality of reserved holes in the outer vertical target transition support;
(c) fixing and positioning the outer vertical target transition support with the plurality of outer vertical target plasma-facing units, an outer transition block, the outer horizontal target transition support with the plurality of outer horizontal target plasma-facing units, wherein the outer transition block comprises a transition block main body and a first lower cover plate; the outer vertical target transition support is provided with an S-shaped flow channel; the transition block main body is provided with an intermediate flow channel and two first flow channels respectively arranged at two sides of the intermediate flow channel; and the outer horizontal target transition support is provided with a collector box and a second flow channel; and welding a side of the transition block main body where the intermediate flow channel and the two first flow channels are located, a side of the outer vertical target transition support where the S-shaped flow channel is located, and a side of the outer horizontal target transition support where the collector box and the second flow channel are located;
(d) welding the first lower cover plate with the transition block main body to form the outer transition block; welding the S-shaped cover plate with the outer vertical target plate transition support; and welding a second lower cover plate with the outer horizontal target transition support, wherein the second cover plate is horizontal, so as to form a preliminary outer target assembly structure; and
(e) performing local finish machining on the preliminary outer target assembly structure to alleviate local deformation, so as to obtain the outer target assembly.

Compared to the prior art, this application has the following beneficial effects.
(1) The inner target transition support and the dome transition support are integrated into an inner target-dome transition support, which reduces the number of times that the pipe cutting cut and the connecting structure removal are performed during the separate maintenance of the plasma-facing component.
(2) The plasma-facing unit of the V-shaped region of the outer target assembly is connected to the outer horizontal target transition support and the outer vertical target transition support through the cooling bent tube. The V-shaped region of the outer horizontal target transition support is connected through the high-strength transition block. Meanwhile, the intermediate flow channel of the transition block is communicated with the coolant flowing through the plasma-facing unit. The V-shaped region of the inner target is connected in the same way as that of the outer target. Such design enables the plasma-facing component to be adapted to the flexible plasma configuration operation mode, and at the same time can alleviate the stress and strain.
(3) The fabrication of the outer target is taken as an example to illustrate the preparation of the plasma-facing component, including machining of the plasma-facing units; machining of the vertical and horizontal target transition supports and transition blocks; welding between the transition block main body and back sides of the vertical and horizontal targets; welding of the transition block lower end cover; welding of the S-shaped cover plate; and local finish machining. The preparation method has excellent machining feasibility.

BRIEF DESCRIPTION OF THE DRAWINGS

FIG. 6a: machining of forged parts; FIG. 6b: machining of an internal S-shaped flow channel and first and second collector boxes; FIG. 6c: welding of a second plasma-facing unit connection support; and FIG. 6d: machining of an S-shaped cover plate.

FIG. 8a: connection between a first plasma-facing unit and an outer vertical target transition support; FIG. 8b: aligning and welding between an end bending tube of the first plasma-facing unit and a reserved hole in the outer vertical target transition support; FIG. 8c: positional relationship between a transition block main body, the outer vertical target transition support, and an outer horizontal target transition support; FIG. 8d: sequential welding of a first lower cover plate, the S-shaped cover plate and a second lower cover plate; and FIG. 8e: the overall structure of the outer target assembly.

Figure 1:
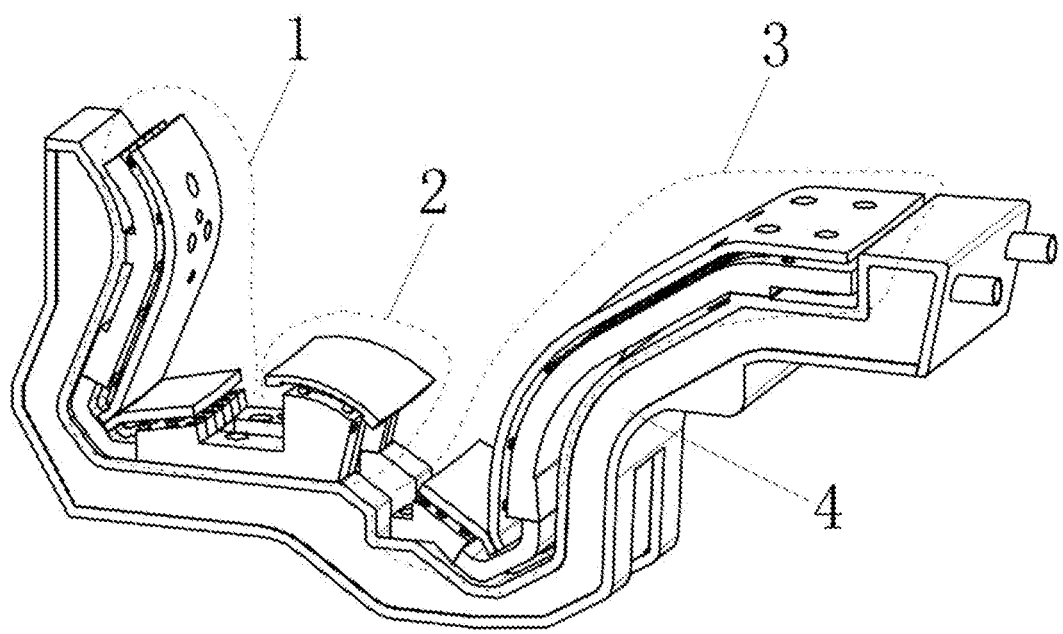
FIG. 1 is a schematic diagram of a fusion reactor divertor according to one embodiment of the present disclosure.

In the drawings: 1—inner target assembly; 2—dome; 3—outer target assembly; 4—cassette body; 5—first V-shaped region; 6—second V-shaped region; 7—intermediate flow channel; 8—side flow channel; 9—first collector box; 10—second collector box; 11—first cooling tube; 12—second cooling tube; 13—first plasma-facing unit connection support; 14—second plasma-facing unit connection support; 15—S-shaped cover plate; 16—second lower cover plate; 1.1—inner vertical target; 1.2—inner horizontal target; 1.3—first transition support; 1.4—inner transition block; 2.1—dome umbrella; 2.2—second transition support; 3.1—first plasma-facing unit; 3.2—second plasma-facing unit; 3.3—outer horizontal target transition support; 3.4—outer transition block; 3.5—outer vertical target transition support; 3.6—water inlet pipe; 3.7—water outlet pipe; 3.4.1—transition block main body; and 3.4.2—first lower cover plate.

DETAILED DESCRIPTION OF EMBODIMENTS

In order to make the objects, technical solutions and advantages of the disclosure clearer, the disclosure will be further described in detail below in conjunction with the accompanying drawings and embodiments. It should be understood that the embodiments described herein are merely for explaining the disclosure and are not intended to limit the disclosure. Furthermore, the technical features involved in various embodiments of the disclosure may be combined with each other without contradiction.

Figure 2A:
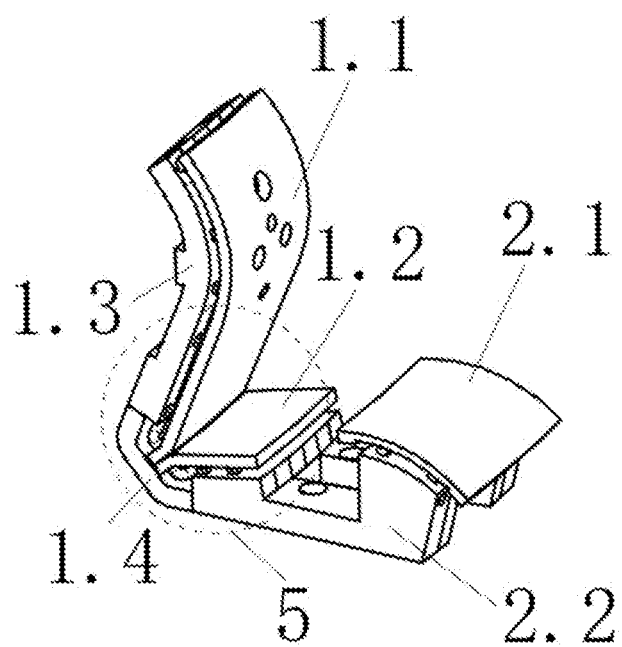
FIG. 2a structurally shows a combination of an inner target assembly and a dome of a plasma-facing component according to one embodiment of the present disclosure.
Figure 2B:
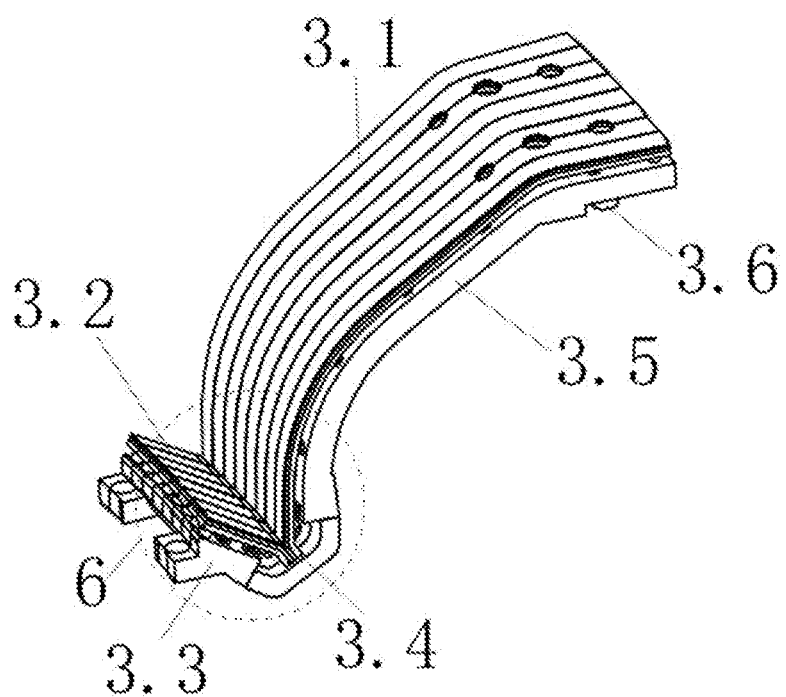
FIG. 2b structurally shows an outer target assembly of the plasma-facing component according to one embodiment of the present disclosure.

As shown in FIGS. 1 and 2a-2b, a fusion reactor divertor includes a plasma-facing component and a cassette body 4. The plasma-facing component includes an inner target assembly 1, a dome 2, and an outer target assembly 3. The cassette body 4 serves as a main support component to connect the inner target assembly 1, the dome 2, and the outer target assembly 3 into a whole. The inner target assembly 1 includes an inner vertical target 1.1, an inner horizontal target 1.2, a first transition support 1.3 connected to the inner vertical target 1.1, and an inner transition block 1.4. The dome 2 includes a dome umbrella 2.1 and a second transition support 2.2. The outer target assembly 3 includes an outer vertical target, an outer horizontal target, an outer horizontal target transition support 3.3, a water inlet pipe 3.6, and a water outlet pipe 3.7.

In this embodiment, the outer vertical target consists of a plurality of first plasma-facing unit 3.1. The outer horizontal target consists of a plurality of second plasma-facing units 3.2. The structure of the inner vertical target is the same as that of the outer vertical target; and the structure of the inner horizontal target is the same as that of the outer horizontal target. The dome umbrella 2.1 also consists of a plurality of plasma-facing units.

The materials of the plasma-facing units constituting the inner vertical target, the inner horizontal target, the dome umbrella, the outer horizontal target and the outer vertical target are tungsten, oxygen-free copper, chromium-zirconium copper and stainless steel, which are made into the plasma-facing units through the processes of casting, explosion welding, hot isostatic pressing, braze welding, argon arc welding and so on.

To reduce the number of times that the first cooling pipe 11 and the second cooling pipe 12 are cut and the connecting structure between the plasma-facing component and the cassette body is dismantled during separate maintenance of the inner target assembly 1 and the dome 2, the first transition support 1.3, the inner transition block 1.4, and the second transition support 2.2 are integrated into an inner target-dome transition support made of stainless steel and high-strength stainless steel. The inner transition block 1.4 is made of high-strength stainless steel, in order to increase the strength of the first V-shaped region 5 of the inner target assembly.

The plasma-facing unit of a second V-shaped region 6 of the outer target assembly is connected to the outer horizontal target transition support 3.3 and the outer vertical target transition support 3.5, respectively, by a curved cooling pipe. The outer horizontal target transition support 3.3, the outer transition block 3.4, and the outer vertical target transition support 3.5 are integrated into the outer horizontal target transition support 3.3, which is made of stainless steel and high-strength stainless steel. The outer transition block 3.4 is made of high-strength stainless steel to increase the strength of the second V-shaped region 6 of the outer target assembly.

The second V-shaped region 6 is connected through the high-strength outer transition block 3.4. At the same time, the outer transition block 3.4 includes an intermediate flow channel configured for communicating with the coolant flowing through the plasma-facing unit of the outer target assembly. The first V-shaped region 5 is connected in the same manner as the second V-shaped region 6 and connected through the high-strength inner transition block 1.4. At the same time, the inner transition block 1.4 includes the intermediate flow channel configured for communicating with the coolant flowing through the plasma-facing unit of the inner target assembly. The above arrangement fits flexible plasma shape operation modes while relieving stress and strain.

As shown in FIGS. 1, 2a-2b, 5, 6a-6d, and 8a-8e, the outer vertical target transition support 3.5, the outer horizontal target transition support 3.3, and the outer transition block 3.4 are fixedly welded to the outer transition block 3.4 at the intersecting surfaces. The outer vertical target transition support 3.5 and the outer horizontal target transition support 3.3 are fixedly welded to the second plasma-facing unit connection support 14, respectively. The outer vertical target transition support 3.5 and the plurality of first plasma-facing units 3.1 are connected by pins to the welded first plasma-facing unit connection support 13 and the second plasma-facing unit connection support 14, respectively. Similarly, the outer horizontal target transition support 3.3 and the plurality of second plasma-facing units 3.2 are connected by pins to the welded first plasma-facing unit connection support 13 and the second plasma-facing unit connection support 14, respectively.

The first transition support 1.3, the second transition support 2.2, and the inner transition block 1.4 are welded at the intersection surface. Similarly, the first transition support 1.3 and the second transition support 2.2 are welded to the second plasma-facing unit connection support 14, respectively. Similarly, the first transition support 1.3, and the second transition support 2.2 are each secured to the plasma-facing unit by pinning.

The inner target-dome transition support integrated by the inner target assembly and the dome is bolted to the cassette body 4. The third transition support included in the outer target assembly is bolted to the cassette body 4.

Figure 3:
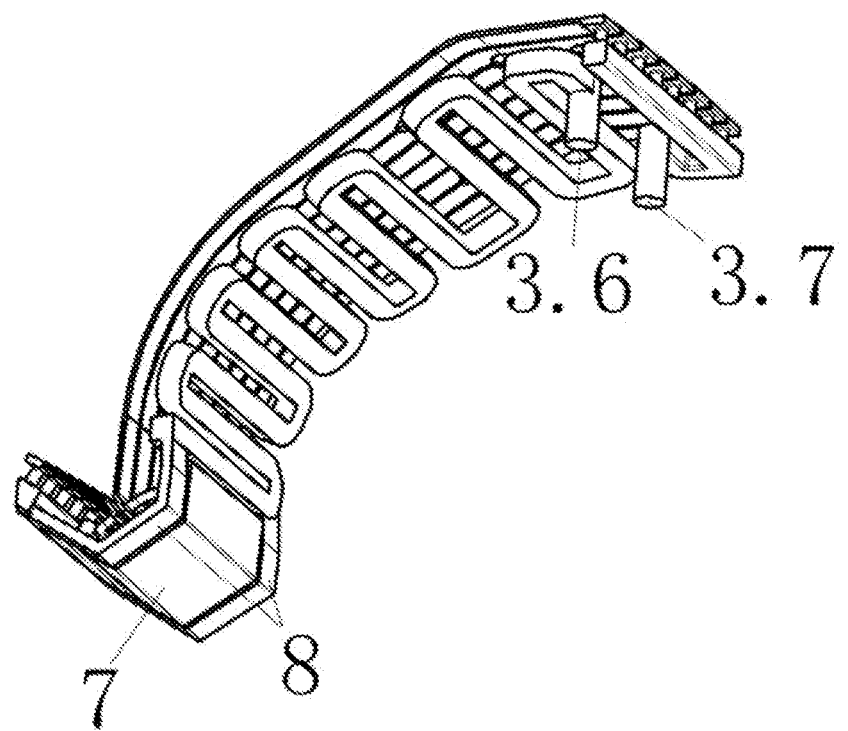
FIG. 3 is a schematic diagram of internal flow channels of the outer target assembly according to one embodiment of the present disclosure.
Figure 4:
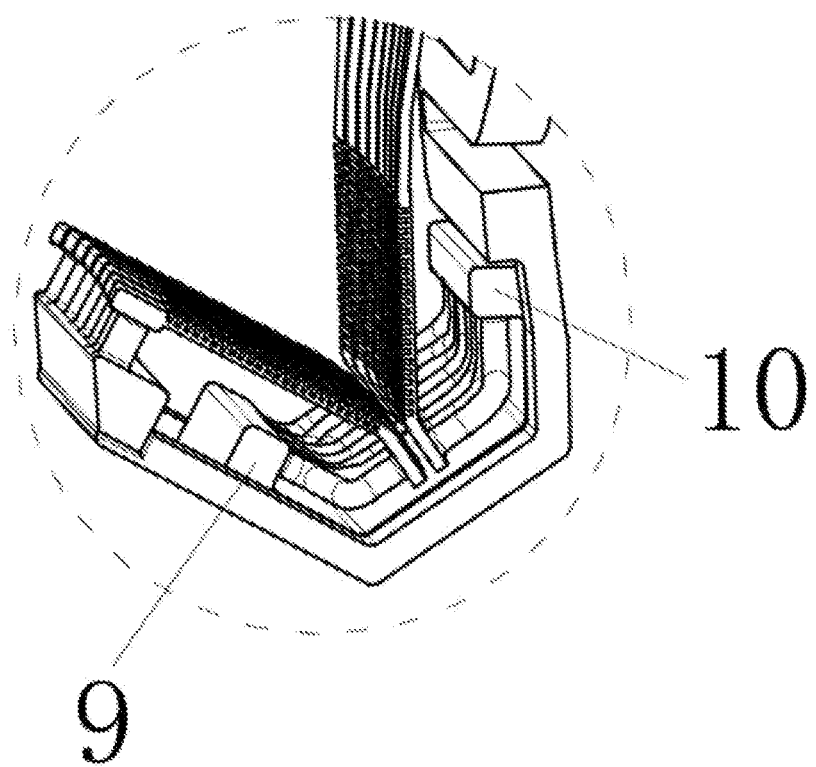
FIG. 4 is a schematic diagram of internal flow channels of a V-shaped region of the outer target assembly according to one embodiment of the present disclosure.

As shown in the internal flow channel structure of the outer target assembly in FIG. 3, in conjunction with FIG. 2b and FIG. 4, the flow channels in the third transition support include an S-shaped flow channel, an intermediate flow channel 7, two side flow channels 8, a first collector box 9, a second collector box 10, and other flow channels and collector boxes. The S-shaped flow channel, the second collector box 10, and some of the flow channels and collector boxes are in the outer vertical target transition support 3.5. The intermediate flow channel 7 and the two side flow channels 8 are in the outer transition block 3.4. The first collector box 9, some of the flow channels and collector boxes are in the outer horizontal target transition support 3.3.

The internal flow channels in the outer target-dome transition support are similar to those in the outer target assembly. The first transition support 1.3 includes S-shaped flow channels, two collector boxes, and other flow channels. The second transition support 2.2 includes S-shaped flow channels, a plurality of collector boxes, and other flow channels. The inner transition block 1.4 includes an intermediate flow channel and two side flow channels respectively arranged at two sides of the intermediate flow channel.

The outer target assembly is described in detail as an example. The inner target assembly and the dome are prepared in a similar manner as the outer target assembly.

Figure 5:
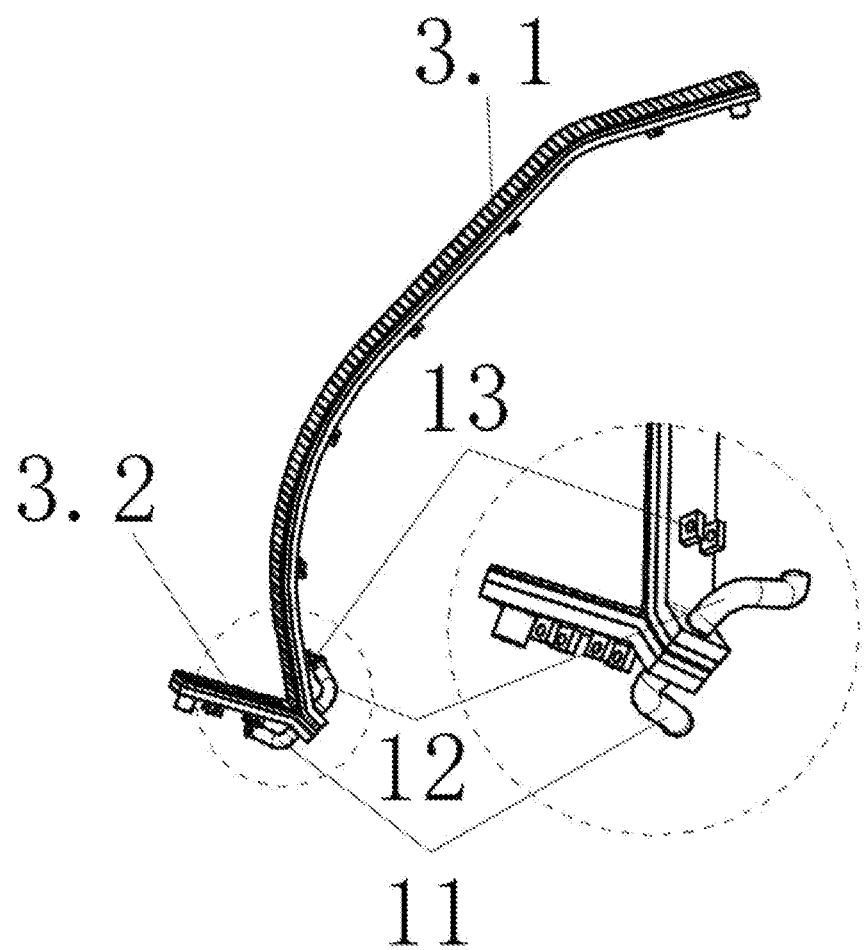
FIG. 5 is a schematic diagram of a plasma-facing unit according to one embodiment of the present disclosure.

As shown in FIG. 5, a plurality of the first plasma-facing units 3.1 of the outer vertical target are processed and qualified for installation. A plurality of the second plasma-facing units 3.2 of the outer horizontal target are processed and qualified for installation.

Figure 6A:
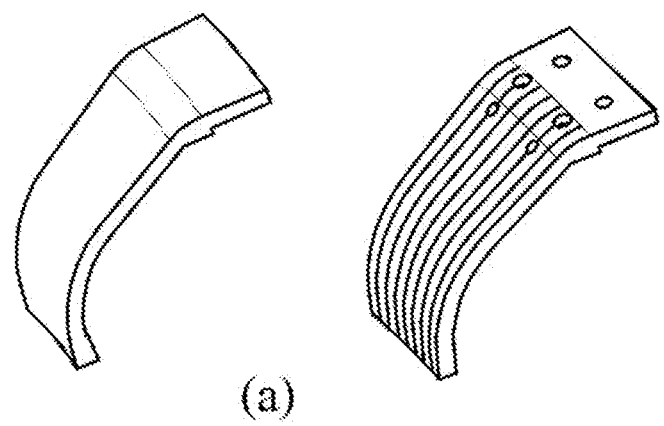
FIGS. 6a-6d show a processing flowchart of an outer vertical target transition support, where
Figure 6B:
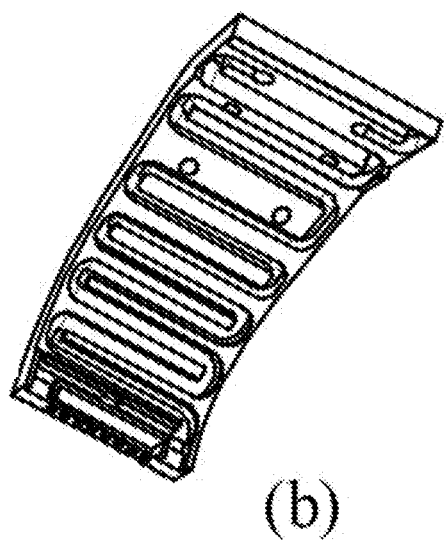
Figure 6C:
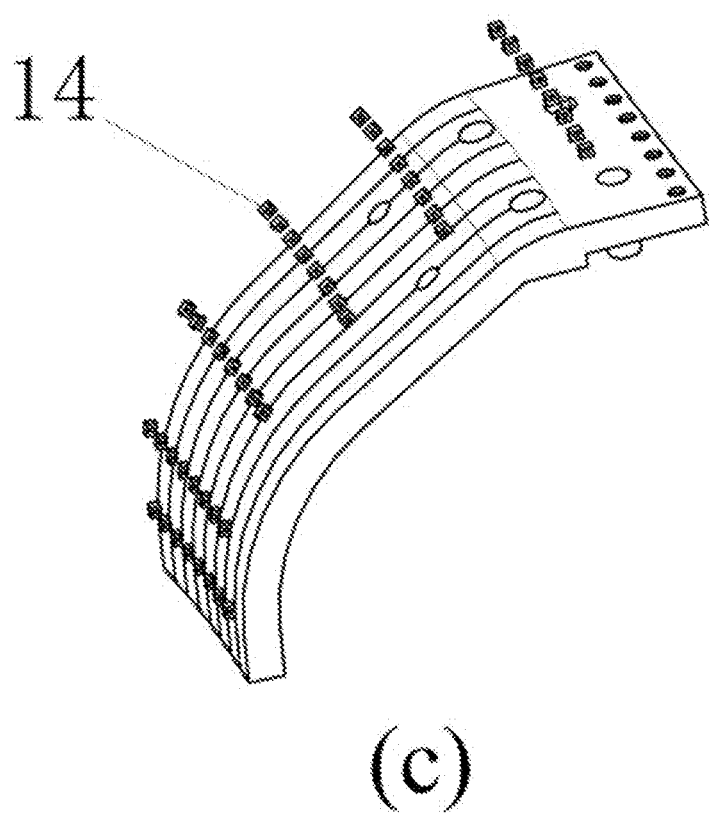
Figure 6D:
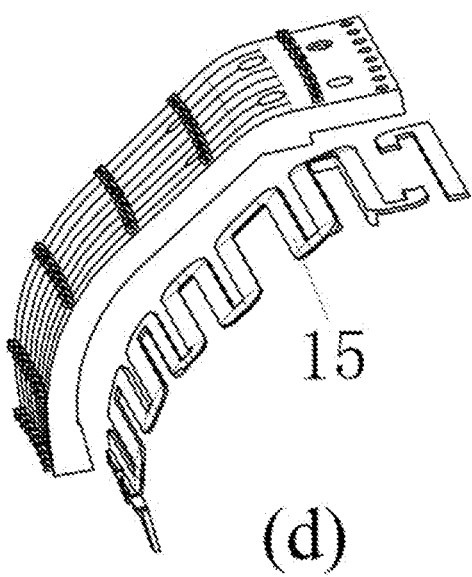

As shown in FIGS. 6a-6d, the preparation process of the outer vertical target transition support 3.5 includes the following steps.
(a) As shown in FIG. 6a, the blank forging parts are processed.
(b) As shown in FIG. 6b, the S-shaped flow channel, the first collector box, and the second collector box are machined.
(c) As shown in FIG. 6c, the second plasma-facing unit connection support 14 is welded.
(d) As shown in FIG. 6d, the S-shaped cover plate 15 is machined to be installed.

The outer horizontal target transition support 3.3 is processed in the same manner as the outer vertical target transition support 3.5.

Figure 7:
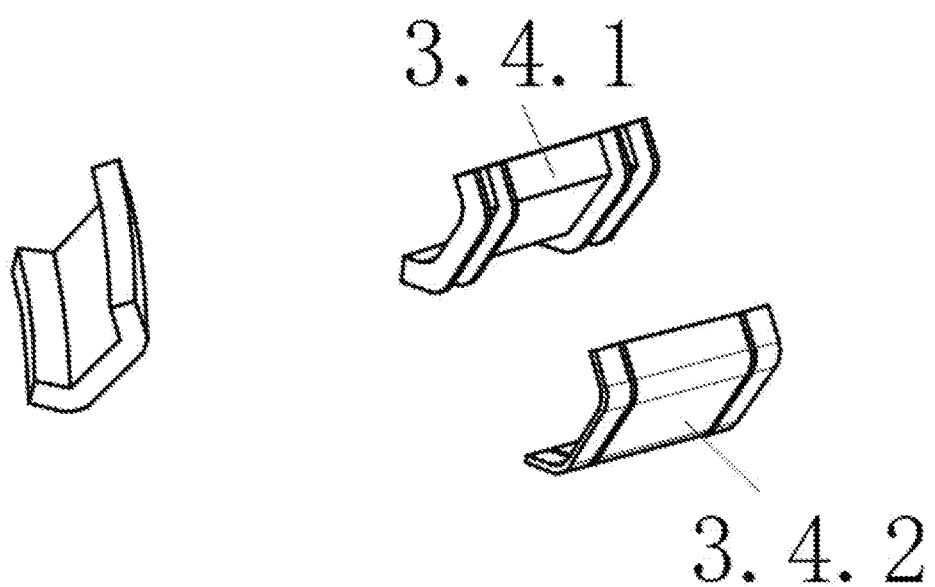
FIG. 7 is a schematic diagram of an outer transition block according to one embodiment of the present disclosure.

The outer vertical target transition support 3.5 and the outer horizontal target transition support 3.3 finish machining and test, and both the outer vertical target transition support 3.5 and the outer horizontal target transition support 3.3 do not include the S-shaped cover plate. The plasma-facing unit is processed and qualified. As shown in FIG. 7, the transition block main body 3.4.1 and the first lower cover plate 3.4.2 are processed and qualified.

Figure 8A:
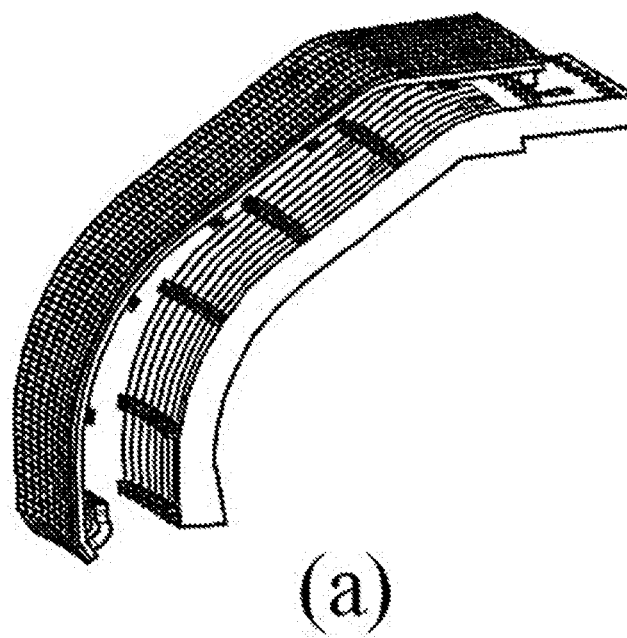
FIGS. 8a-8e is a preparation flow chart of the outer target assembly, where
Figure 8B:
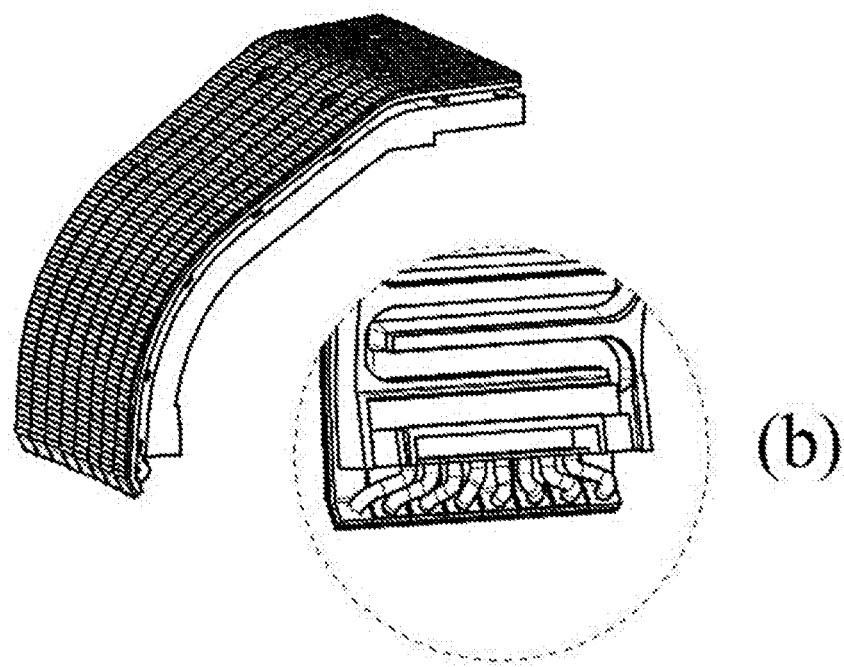
Figure 8C:
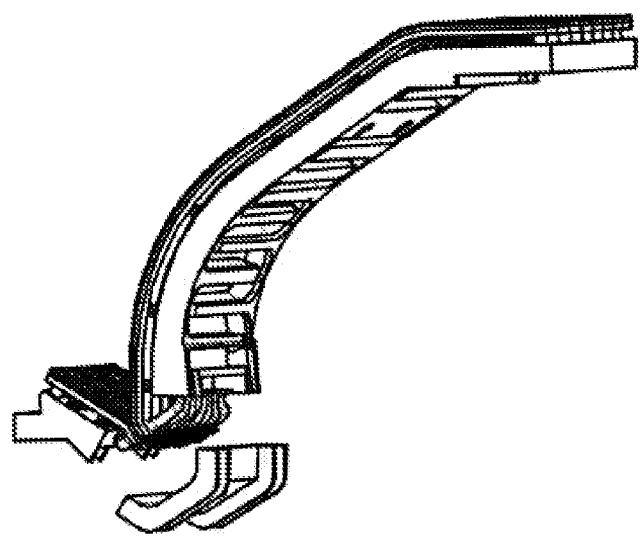
Figure 8D:
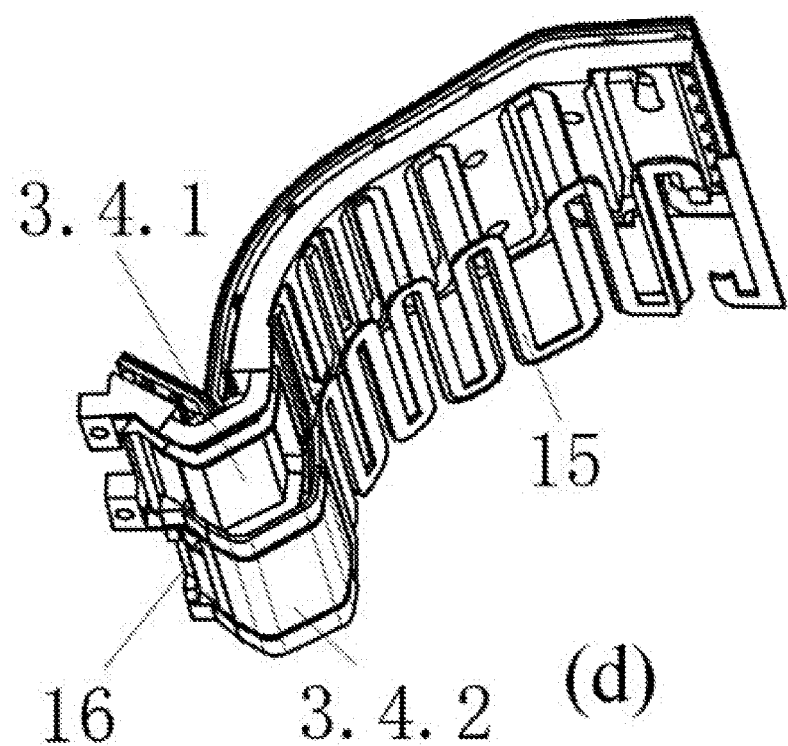
Figure 8E:
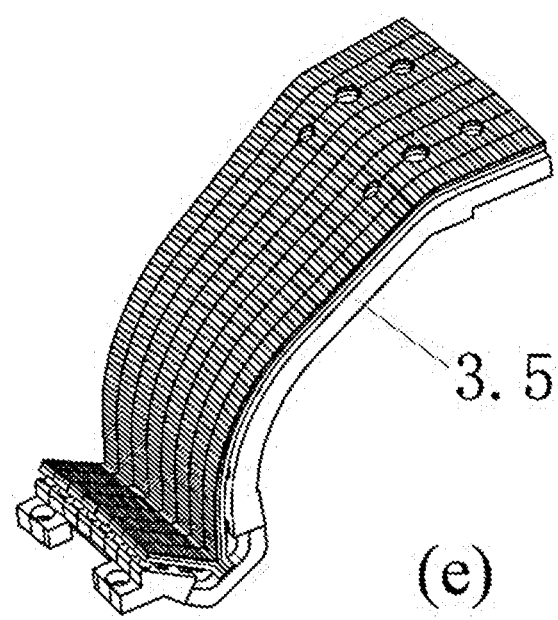

As shown in FIGS. 8a-8e, the preparation process of the outer target assembly further includes the following steps.
(a) As shown in FIG. 8a, a plurality of the first plasma-facing units 3.1 are pinned to the outer vertical target transition support 3.5 without the S-shaped cover plate. A plurality of the second plasma-facing units 3.2 are pinned to the outer horizontal target transition support 3.3.
(b) As shown in FIG. 8b, at the same time as the step (a), the end bending tubes of the first plasma-facing units 3.1 are aligned respectively with the reserved holes in the outer vertical target transition support 3.5.
(c) As shown in FIG. 8c, the outer vertical target transition support 3.5 with a plurality of first plasma-facing units 3.1, the outer transition block 3.4, and the outer horizontal target transition support 3.3 with a plurality of second plasma-facing units 3.2 are fixed and positioned. The outer transition block 3.4 includes the transition block main body 3.4.1 and the first lower cover plate 3.4.2. The outer vertical target transition support 3.5 is provided with the S-shaped flow channel. The transition block main body 3.4.1 is provided with the intermediate flow channel 7 and two side flow channels 8. The outer horizontal target transition support 3.3 is provided with a first collector box 9 and other flow channels. A side of the transition block main body 3.4.1 where the intermediate flow channel 7 and the two side flow channels 8 are located, a side of the outer vertical target transition support 3.5 where the S-shaped flow channel is located, and a side of the outer horizontal target transition support 3.3 where the collector box 9 and other flow channels are located are weld.
(d) As shown in FIG. 8d, the first lower cover plate 3.4.2 and the transition block main body 3.4.1 are welded to form the outer transition block 3.4. The S-shaped cover plate 15 is welded with the outer vertical target plate transition support 3.5. The second lower cover plate 16 is welded with the outer horizontal target transition support 3.3. The second lower cover plate 16 is horizontal, so as to form a preliminary outer target assembly structure.
(e) As shown in FIG. 8e, local finish machining is performed on the preliminary outer target assembly structure to alleviate local deformation from welding or other processes, so as to obtain the outer target assembly.

The above embodiments are described to facilitate the understanding of the disclosure. It is clear that described above are merely some embodiments of the disclosure, which are not intended to limit the disclosure. For those skilled in the art, other embodiments obtained based on these embodiments without paying creative efforts should fall within the scope of the disclosure.

What is claimed is:

1. A method of preparing an outer target assembly of a plasma-facing component of a fusion reactor divertor, comprising:
   (a) pinning a plurality of outer vertical target plasma-facing units to an outer vertical target transition support; and pinning a plurality of outer horizontal target plasma-facing units to an outer horizontal target transition support;
   (b) aligning end bending tubes of the plurality of outer vertical target plasma-facing units respectively with a plurality of reserved holes in the outer vertical target transition support;
   (c) fixing and positioning the outer vertical target transition support with the plurality of outer vertical target plasma-facing units, an outer transition block, the outer horizontal target transition support with the plurality of outer horizontal target plasma-facing units, wherein the outer transition block comprises a transition block main body and a first lower cover plate; the outer vertical target transition support is provided with an S-shaped flow channel; the transition block main body is provided with an intermediate flow channel and two first flow channels respectively arranged at two sides of the intermediate flow channel; and the outer horizontal target transition support is provided with a collector box and a second flow channel; and welding a side of the transition block main body where the intermediate flow channel and the two first flow channels are located, a side of the outer vertical target transition support where the S-shaped flow channel is located, and a side of the outer horizontal target transition support where the collector box and the second flow channel are located;

(d) welding the first lower cover plate with the transition block main body to form the outer transition block; welding an S-shaped cover plate with the outer vertical target transition support; and welding a second lower cover plate with the outer horizontal target transition support, wherein the second lower cover plate is horizontal, so as to form a preliminary outer target assembly structure; and (e) performing local finish machining on the preliminary outer target assembly structure to alleviate local deformation, so as to obtain the outer target assembly.

* * * * *